(12) United States Patent
Liang

(10) Patent No.: US 12,451,145 B2
(45) Date of Patent: Oct. 21, 2025

(54) SPEECH TRANSMISSION METHOD, SYSTEM AND APPARATUS, COMPUTER-READABLE STORAGE MEDIUM, AND DEVICE

(71) Applicant: Tencent Technology (Shenzhen) Company Limited, Guangdong (CN)

(72) Inventor: Junbin Liang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 883 days.

(21) Appl. No.: 17/685,242

(22) Filed: Mar. 2, 2022

(65) Prior Publication Data

US 2022/0189491 A1 Jun. 16, 2022

Related U.S. Application Data

(63) Continuation of application No. PCT/CN2020/124263, filed on Oct. 28, 2020.

(30) Foreign Application Priority Data

Feb. 20, 2020 (CN) .......................... 202010104793.7

(51) Int. Cl.
*G10L 19/005* (2013.01)
*G06N 3/08* (2023.01)
(Continued)

(52) U.S. Cl.
CPC .............. *G10L 19/005* (2013.01); *G06N 3/08* (2013.01); *G10L 19/008* (2013.01); *G10L 19/16* (2013.01);
(Continued)

(58) Field of Classification Search
None
See application file for complete search history.

(56) References Cited

U.S. PATENT DOCUMENTS

| 8,010,351 B2 * | 8/2011 | Gao ...................... G10L 19/005 |
| | | 704/207 |
| 10,652,120 B2 * | 5/2020 | Kim .................... H04L 43/0829 |

(Continued)

FOREIGN PATENT DOCUMENTS

| CN | 106937134 A | 7/2017 |
| CN | 109616129 A | 4/2019 |

(Continued)

OTHER PUBLICATIONS

Sheng Cheng, Han Hu, Xinggong Zhang, Zongming Guo; DeepRS: Deep-learning Based Network-Adaptive FEC for Real-Time Video Communications; Jan. 22, 2020; URL: https://arxiv.org/pdf/2001.07852 (Year: 2020).*

(Continued)

*Primary Examiner* — Richa Sonifrank
(74) *Attorney, Agent, or Firm* — ArentFox Schiff LLP

(57) ABSTRACT

An audio transmission method is described. A packet loss recovery capability corresponding to current encoded data of an audio signal can be determined according to a first audio encoding feature parameter corresponding to the current encoded data and a second audio encoding feature parameter corresponding to previous or subsequent encoded data of the current encoded data using a packet loss recovery capability prediction neural network model. Whether to perform redundant encoding for the current encoded data can be determined according to the packet loss recovery capability. In response to the redundant encoding being determined to be performed, the redundant encoding can be performed according to the current encoded data to generate a corresponding redundancy packet.

17 Claims, 6 Drawing Sheets

(51) Int. Cl.
*G10L 19/008* (2013.01)
*G10L 19/16* (2013.01)
*G10L 25/60* (2013.01)
*H04L 1/00* (2006.01)

(52) U.S. Cl.
CPC ............ *G10L 19/167* (2013.01); *G10L 25/60* (2013.01); *H04L 1/0002* (2013.01); *H04L 1/0009* (2013.01); *H04L 1/0019* (2013.01); *H04L 1/0026* (2013.01); *H04L 1/0041* (2013.01)

(56) References Cited

U.S. PATENT DOCUMENTS

| | | | |
|---|---|---|---|
| 11,671,448 B2* | 6/2023 | Nunes | G06N 3/044 726/1 |
| 11,715,480 B2* | 8/2023 | Byun | G10L 21/02 704/226 |
| 11,914,599 B2* | 2/2024 | Lillestolen | G06F 16/24568 |
| 2005/0228651 A1 | 10/2005 | Wang et al. | |
| 2017/0084280 A1* | 3/2017 | Srinivasan | H04N 19/166 |
| 2019/0051310 A1 | 2/2019 | Chang et al. | |
| 2019/0080701 A1 | 3/2019 | Cheluvaraja et al. | |
| 2019/0371345 A1* | 12/2019 | Bhatia | G10L 19/167 |
| 2020/0204296 A1* | 6/2020 | Srinivasan | G10L 19/005 |
| 2021/0075544 A1* | 3/2021 | Pollack | H04L 49/9023 |
| 2022/0208200 A1* | 6/2022 | Wang | G10L 19/008 |
| 2025/0182773 A1* | 6/2025 | Kurtz | G10L 25/60 |

FOREIGN PATENT DOCUMENTS

| | | | |
|---|---|---|---|
| CN | 110265046 A | | 9/2019 |
| CN | 110620892 A | | 12/2019 |
| CN | 111312264 A | | 6/2020 |
| EP | 1981170 A1 | | 10/2008 |
| EP | 3899928 A1 | | 10/2021 |
| JP | WO2008007698 A1 | | 12/2009 |
| KR | 100462024 B1 | | 12/2004 |

OTHER PUBLICATIONS

International Search Report and Written Opinion issued Jan. 27, 2021 in International Application No. PCT/CN2020/124263 with English translation, 8 pgs.

Supplementary European Search Report issued Nov. 25, 2022 in Application No. 20920497.3. (37 pages).

Indian Office Action issued Sep. 23, 2022 in Application No. 202237020222. (6 pages).

* cited by examiner

SPEECH TRANSMISSION METHOD, SYSTEM AND APPARATUS, COMPUTER-READABLE STORAGE MEDIUM, AND DEVICE

RELATED APPLICATION

This application is a continuation of International Application No. PCT/CN2020/124263, filed on Oct. 28, 2020, which claims priority to Chinese Patent Application No. 202010104793.7, filed on Feb. 20, 2020. The entire disclosures of the prior applications are hereby incorporated by reference in their entirety.

FIELD OF THE TECHNOLOGY

This application relates to the field of computer technologies, including a speech transmission method, system and apparatus, a computer-readable storage medium, and a computer device.

BACKGROUND OF THE DISCLOSURE

The Internet is a non-reliable transmission network in terms of packet loss in best-efforts transmission. Therefore, a main problem of Internet-based voice transmission (VoIP) is the unstable quality caused by packet loss concealment. Due to instability of the transmission network, packet loss occurs during transmission. In order to achieve packet loss concealment of the network, a channel encoding algorithm of forward error correction (FEC) redundant encoding is usually used to generate a redundancy packet. The redundancy packet and a data packet are sent to a receive end. After receiving the redundancy packet and the data packet, the receive end recovers a lost data packet by using the redundancy packet and an original packet, thereby achieving packet loss concealment.

The FEC redundant encoding relying on the generation of the redundancy packet to achieve packet loss concealment of the transmission network inevitably lead to an increase in bandwidth and excess consumption of network bandwidth resources. A stronger packet loss concealment enhancement leads to higher consumption of network bandwidth, especially for a bandwidth-constrained scenario in which network congestion and other problems are likely to occur and thus cause more packet losses.

SUMMARY

Aspects of the disclosure provide an audio transmission method. The method can include receiving current encoded data of an audio signal. A packet loss recovery capability corresponding to the current encoded data can be determined according to a first audio encoding feature parameter corresponding to the current encoded data and a second audio encoding feature parameter corresponding to previous or subsequent encoded data of the current encoded data using a packet loss recovery capability prediction neural network model. The packet loss recovery capability corresponds to a quality loss of a decoded audio when the current encoded data is lost while being transmitted over a network. Whether to perform redundant encoding for the current encoded data can be determined according to the packet loss recovery capability. In response to the redundant encoding being determined to be performed, the redundant encoding can be performed according to the current encoded data to generate a corresponding redundancy packet.

Aspects of the disclosure can provide an audio transmission apparatus. The apparatus can include processing circuitry configured to receive current encoded data of an audio signal. A packet loss recovery capability corresponding to the current encoded data can be determined according to a first audio encoding feature parameter corresponding to the current encoded data and a second audio encoding feature parameter corresponding to previous or subsequent encoded data of the current encoded data using a packet loss recovery capability prediction neural network model. The packet loss recovery capability corresponds to a quality loss of a decoded audio when the current encoded data is lost while being transmitted over a network. Whether to perform redundant encoding for the current encoded data can be determined according to the packet loss recovery capability. In response to the redundant encoding being determined to be performed, the redundant encoding can be performed according to the current encoded data to generate a corresponding redundancy packet.

Aspects of the disclosure can provide a non-transitory computer-readable storage medium storing instructions which when executed by at least one processor cause the at least one processor to perform the audio transmission method.

BRIEF DESCRIPTION OF THE DRAWINGS

The following briefly describes accompanying drawings for describing the embodiments. The accompanying drawings in the following description show merely some embodiments of this application, and a person skilled in the art may still derive other drawings from these accompanying drawings.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are merely used for explaining this application but are not intended to limit this application.

Figure 1:
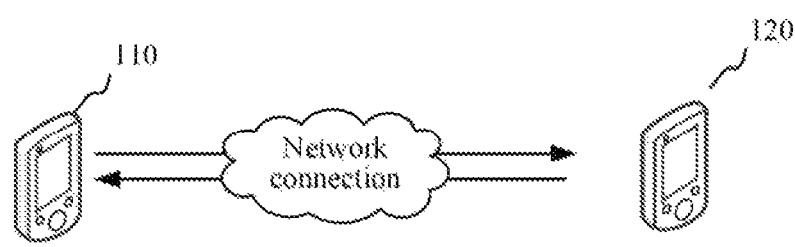
FIG. 1 is an application environment diagram of a speech transmission method in an embodiment.

FIG. 1 is an application environment diagram of a speech (audio) transmission method in an embodiment. Referring to FIG. 1, the speech transmission method is applied to a speech (audio) transmission system. The speech transmission system includes a transmit end 110 and a receive end 120. The transmit end 110 and the receive end 120 are connected through a network. The transmit end 110 and the receive end 120 each may be a terminal. The terminal may be a desktop terminal or a mobile terminal. The mobile terminal may be one of a mobile phone, a tablet computer, a notebook computer, and the like. In some other embodiments, the transmit end 110 and the receive end 120 each may be a server or a server cluster.

Figure 2:
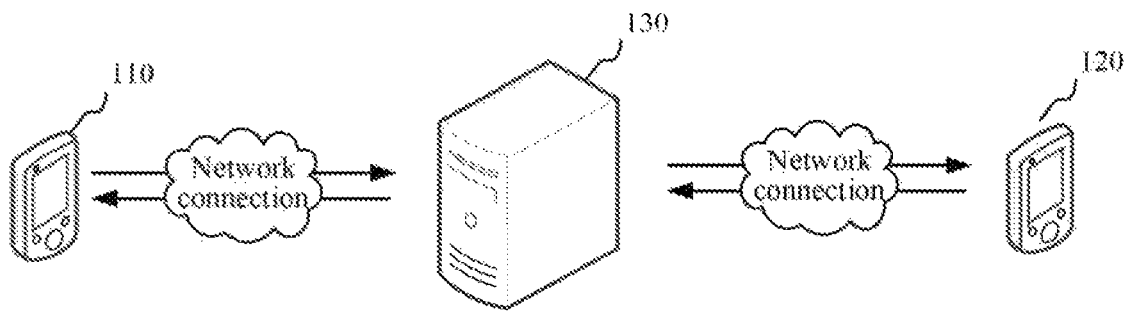
FIG. 2 is an application environment diagram of a speech transmission method in another embodiment.

As shown in FIG. 2, in a exemplary application scenario, an application supporting a speech (audio) transmission function runs on each of the transmit end 110 and the receive end 120. The server 130 may provide a calculation capability and a storage capability for the application. The transmit end 110 and the receive end 120 both may be connected to the server 130 through a network, thereby implementing speech transmission at the two ends based on the server 130. The server 130 may be implemented by using an independent server or a server cluster including multiple servers.

In embodiment, the transmit end 110 may obtain current encoded data in a speech (audio) encoding bitstream; obtain a packet loss recovery capability corresponding to the current encoded data according to a first speech encoding feature parameter corresponding to the current encoded data and a second speech encoding feature parameter corresponding to previous encoded data of the current encoded data by using a packet loss recovery capability prediction model based on machine learning: determine. according to the packet loss recovery capability, whether redundant encoding needs to be performed; and perform redundant encoding according to the current encoded data to generate a corresponding redundancy packet, and then transmit the current encoded data and the redundancy packet to the receive end 120, when redundant encoding needs to be performed; or directly transmit the current encoded data to the receive end 120 when redundant encoding does not need to be performed. This can effectively improve the overall utilization of network bandwidth and also ensure a packet loss concealment capability of a transmission network.

Figure 3:
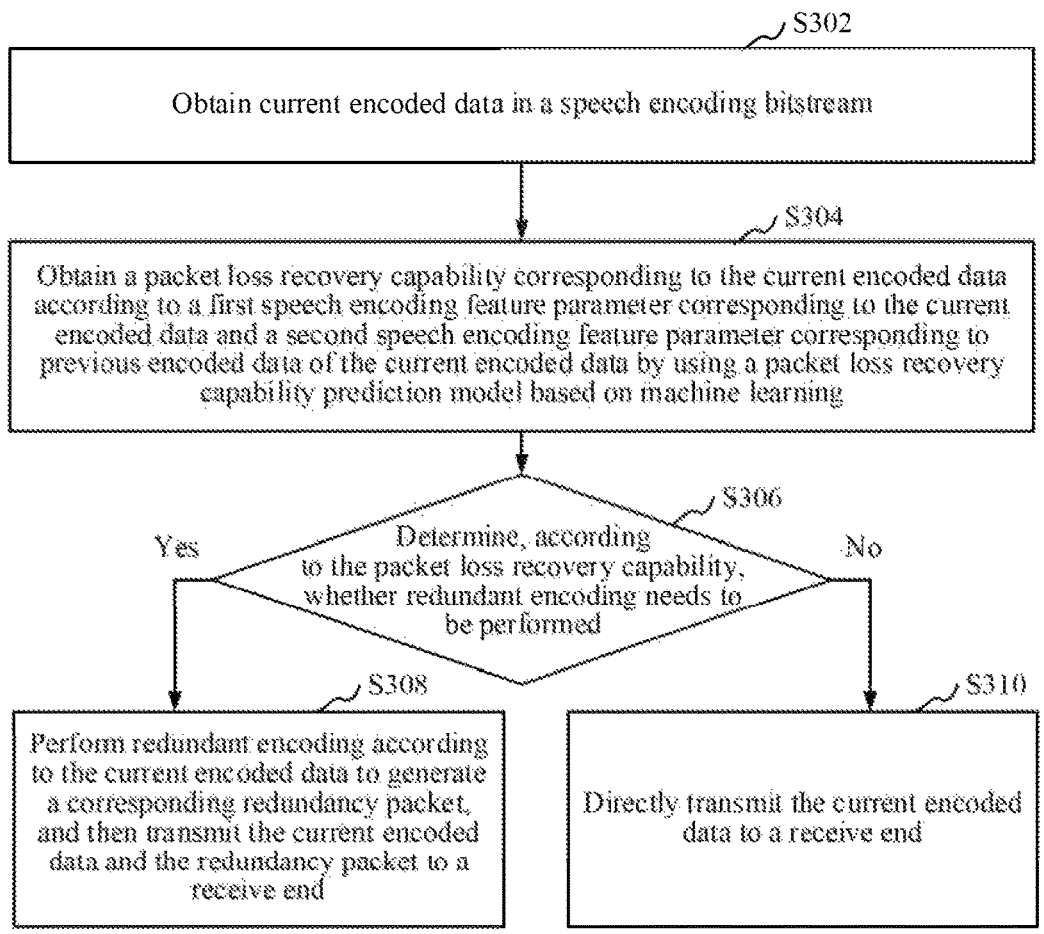
FIG. 3 is a schematic flowchart of a speech transmission method in an embodiment.

As shown in FIG. 3, according to an embodiment, a speech transmission method is provided. This embodiment is mainly described by using an example in which the method is applied to the transmit end 110 in FIG. 1 or FIG. 2. Referring to FIG. 3, the speech transmission method includes the following steps S302 to S308.

In S302, current encoded data in a speech encoding bitstream can be obtained.

The speech encoding bitstream is an original bitstream obtained by performing speech (audio) encoding on a speech (audio) signal. The speech encoding bitstream includes a set of encoded data to be transmitted. The encoded data may be an encoded data frame obtained by encoding the speech signal by a speech encoder at the transmit end according to a specific frame length. The transmit end may transmit the encoded data frame in the speech encoding bitstream to a receive end through a network. The encoded data may alternatively be an encoded data packet obtained by synthesizing multiple encoded data frames. The transmit end may transmit the encoded data packet in the speech encoding bitstream to a receive end through a network. For example, an encoder at the transmit end obtains a speech signal of 60 ms, divides the speech signal into four frames with a frame length of 15 ms, and encodes the frames in sequence, to obtain four encoded data frames. The transmit end may sequentially transmit the encoded data frames to the receive end. The transmit end may alternatively synthesize the four encoded data frames into one encoded data packet, and then transmits the encoded data packet to the receive end through the network.

Figure 4:
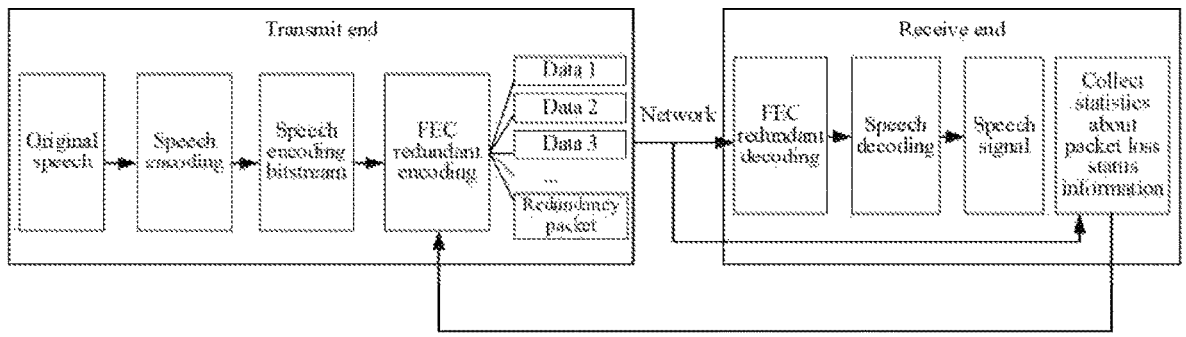
FIG. 4 is a schematic block diagram of speech transmission by using a forward error correction (FEC) redundant encoding mechanism in an embodiment.

In an example, to resolve a problem of packet loss concealment of a transmission network, as shown in FIG. 4, before transmitting the speech encoding bitstream to the receive end, the transmit end directly sends each piece of encoded data in the speech encoding bitstream to the receive end through FEC redundant encoding. The receive end may receive the each piece of encoded data and corresponding redundancy packets through the network, perform redundant decoding according to the redundancy packets to obtain lost (or damaged) encoded data, and then perform decoding to obtain the speech signal. For example, a speech encoding bitstream to be transmitted includes five pieces of encoded data P1, P2, P3, P4, and P5. The receive end may perform redundant encoding according to the five pieces of encoded data to generate a redundancy packet. There may be one or more redundancy packets. It is assumed herein that two redundancy packets R1 and R2 are generated. P1, P2, P3, P4, and P5 are packaged with R1 and R2 and then sent to the receive end.

In an embodiment, after the transmit end encodes original speech information to obtain a speech encoding bitstream, before sending each piece of encoded data in the speech encoding bitstream to the receive end, the transmit end may sequentially predict a packet loss recovery capability of the receive end for each piece of encoded data in the speech encoding bitstream. The transmit end may sequentially obtain the encoded data in the speech encoding bitstream. The current encoded data is encoded data currently to be transmitted to the receive end.

It can be understood that the current encoded data used in this application is used for describing encoded data being processed by the transmit end currently, and the previous encoded data is used for describing encoded data before the current encoded data in the speech encoding bitstream. The previous encoded data may be one piece of encoded data before the current encoded data, or may be multiple pieces of encoded data before the current encoded data, for example, two pieces of encoded data before the current encoded data. In addition, the current encoded data is a relatively changing object. For example, after the transmit end processes the current encoded data F(i), a next piece of encoded data F(i+1) of the current encoded data F(i) in the speech encoding bitstream may be used as a new piece of current encoded data, and the current encoded data F(i) is used as previous encoded data of the new piece of current encoded data F(i+1).

In an embodiment, the foregoing speech transmission method further includes: obtaining an original speech signal; dividing the original speech signal to obtain an original speech sequence; and sequentially performing speech encoding on speech segments in the original speech sequence to obtain a speech encoding bitstream.

For example, the original speech signal obtained by the transmit end is a speech segment of 2 seconds, and this segment of the speech signal is divided into units of 20 milliseconds to obtain an original speech sequence including 100 speech segments. Then, speech encoding is sequentially performed on the speech segments in the original speech sequence to obtain encoded data corresponding to each speech segment, thereby generating a speech encoding bitstream corresponding to the original speech signal.

In an embodiment, the speech transmission method further includes: obtaining speech encoding feature parameters corresponding to speech segments in an original speech sequence; obtaining a speech encoding bitstream after performing speech encoding on the corresponding speech segments according to the speech encoding feature parameters to generate corresponding encoded data; and caching a speech encoding feature parameter(s) used for each piece of encoded data during speech encoding.

In an example, during speech encoding, the transmit end extracts speech encoding feature parameters of the speech segments in the original speech sequence, and encodes the extracted speech encoding feature parameters to generate encoded data corresponding to each speech segment. For example, the encoder of the transmit end extracts the speech encoding feature parameters of the speech segments through some speech signal processing models (such as filters and feature extractors), performs encoding (such as entropy coding) on these speech encoding feature parameters, and then packages these encoded parameters in a particular data format to obtain the corresponding encoded data. The transmit end may generate current encoded data corresponding to a current speech segment jointly according to a speech encoding feature parameter of the current speech segment and a speech encoding feature parameter of a previous speech segment, or may generate current encoded data corresponding to a current speech segment jointly according to a speech encoding feature parameter of the current speech segment and a speech encoding feature parameter of a subsequent speech segment. The speech encoding feature parameter may be a line spectral frequency (LSF), a pitch period (Pitch Detection), an adaptive codebook gain (adaptive gain), or a fixed codebook gain extracted by signal processing according to the speech segment, and other parameters.

Further, when generating the encoded data corresponding to the each speech segment, the transmit end further caches the speech encoding feature parameters of the speech segments during encoding, that is, speech encoding feature parameters used when generating all the pieces of encoded data, for subsequently predicting a packet loss recovery capability corresponding to the each piece of encoded data based on the cached speech encoding feature parameters.

In S304, a packet loss recovery capability corresponding to the current encoded data can be obtained according to a first speech encoding feature parameter(s) corresponding to the current encoded data and a second speech encoding feature parameter(s) corresponding to previous encoded data of the current encoded data by using a packet loss recovery capability prediction model based on machine learning.

In some embodiments, the packet loss recovery capability is a prediction result that can reflect (or indicate) a speech (audio) quality status (or level) of a recovered packet(s) obtained by performing packet loss recovery on the current encoded data by the receive end after the current encoded data is lost. The prediction result indicates whether the receive end can well recover the lost current encoded data or cannot well recover the lost current encoded data. The packet loss recovery can be realized by packet loss concealment (PLC). The packet loss recovery capability is a packet loss recovery capability for the PLC. The packet loss recovery capability can indicate how well or possibly a lost audio data can be recovered when a specific PLC technique is employed in an example.

When there is a sudden change in a value of the speech encoding feature parameter(s) of the encoded data, the packet loss recovery capability of the receive end is limited (or poor). For example, when there is pitch hopping, LSF mutation, or the like between adjacent or close encoded data, the packet loss recovery capability of the receive end is limited. In this case, enabling FEC redundant encoding at the transmit end can effectively improve a packet loss rate and thus ensure speech quality at the receive end. In the case of relatively smooth fluctuations in values of speech encoding feature parameters of the adjacent encoded data, the receive end usually has a good packet loss recovery capability. In this case, FEC redundant encoding may not need to be enabled at the transmit end. Based on this, it can be learned that the packet loss recovery capability corresponding to the current encoded data is related to the corresponding speech encoding feature parameter(s). A machine learning model can be trained with a large number of training samples to learn how to predict a packet loss recovery capability corresponding to a data packet(s) according to the speech encoding feature parameter(s).

In an example, the transmit end may obtain a cached first speech encoding feature parameter(s) corresponding to the current encoded data and a cached second speech encoding feature parameter(s) corresponding to the previous encoded data, and predict the packet loss recovery capability corresponding to the current encoded data according to the first speech encoding feature parameter(s) and the second speech encoding feature parameter(s) by using a packet loss recovery capability prediction model trained in advance.

In some other embodiments, the transmit end may obtain a packet loss recovery capability corresponding to the current encoded data according to a first speech encoding feature parameter(s) corresponding to the current encoded data and a third speech encoding feature parameter(s) corresponding to subsequent encoded data of the current encoded data by using a packet loss recovery capability prediction model; or obtain a packet loss recovery capability corresponding to the current encoded data according to a second speech encoding feature parameter(s) and/or a third speech encoding feature parameter(s). The subsequent encoded data is used for describing encoded data after the current encoded data in the speech encoding bitstream. The subsequent encoded data may be one piece of encoded data after the current encoded data, or may be multiple pieces of encoded data after the current encoded data, for example, two pieces of encoded data after the current encoded data. A packet loss recovery capability of a current encoded data can be obtained based on a combination or any piece(s) of feature parameters corresponding to the current encoded data itself and feature parameters corresponding prior or subsequent encoded data in various embodiments.

It can be understood that, speech encoding feature parameters corresponding to the encoded data that are to be used by the transmit end as inputs of the packet loss recovery capability prediction model depend on an algorithm rule used by the transmit end during speech encoding or an algorithm rule used by the receive end during speech decoding. Encoding and decoding rules correspond to each other. In an example, if the transmit end needs to generate current encoded data according to a speech encoding feature parameter corresponding to a previous piece of encoded data, during prediction of a packet loss recovery capability corresponding to the current encoded data, the speech encoding feature parameter used for the previous piece of encoded data needs to be used as an input of the packet loss recovery capability prediction model. If the transmit end needs to generate current encoded data according to a speech encoding feature parameter used for a subsequent piece of encoded data, during prediction of a packet loss recovery capability corresponding to the current encoded data, the speech encoding feature parameter used for the subsequent piece of encoded data needs to be used as an input of the packet loss recovery capability prediction model.

The packet loss recovery capability prediction model is a computer model based on machine learning, and may be implemented by using a neural network model. The machine learning model may learn through a sample (or samples), and therefore has a specific capability. In this embodiment, the packet loss recovery capability prediction model is a pre-trained model with a predicted packet loss recovery capability.

In an embodiment, the transmit end may preset a model structure of a machine learning model to obtain an initial machine learning model. and then train the initial machine learning model by using a large quantity of sample speech and packet loss simulation tests to obtain model parameters of the machine learning model. Accordingly, when a speech (audio) needs to be transmitted through a network, the transmit end may obtain a pre-trained model parameter(s), then import the model parameter(s) into the initial machine learning model, to obtain a packet loss recovery capability prediction model, and predict, by using the packet loss recovery capability prediction model, a packet loss recovery capability corresponding to each piece of encoded data in the speech encoding bitstream, thereby determining, according to the predicted packet loss recovery capability, whether to enable FEC redundant encoding on the current encoded data.

Figure 5:
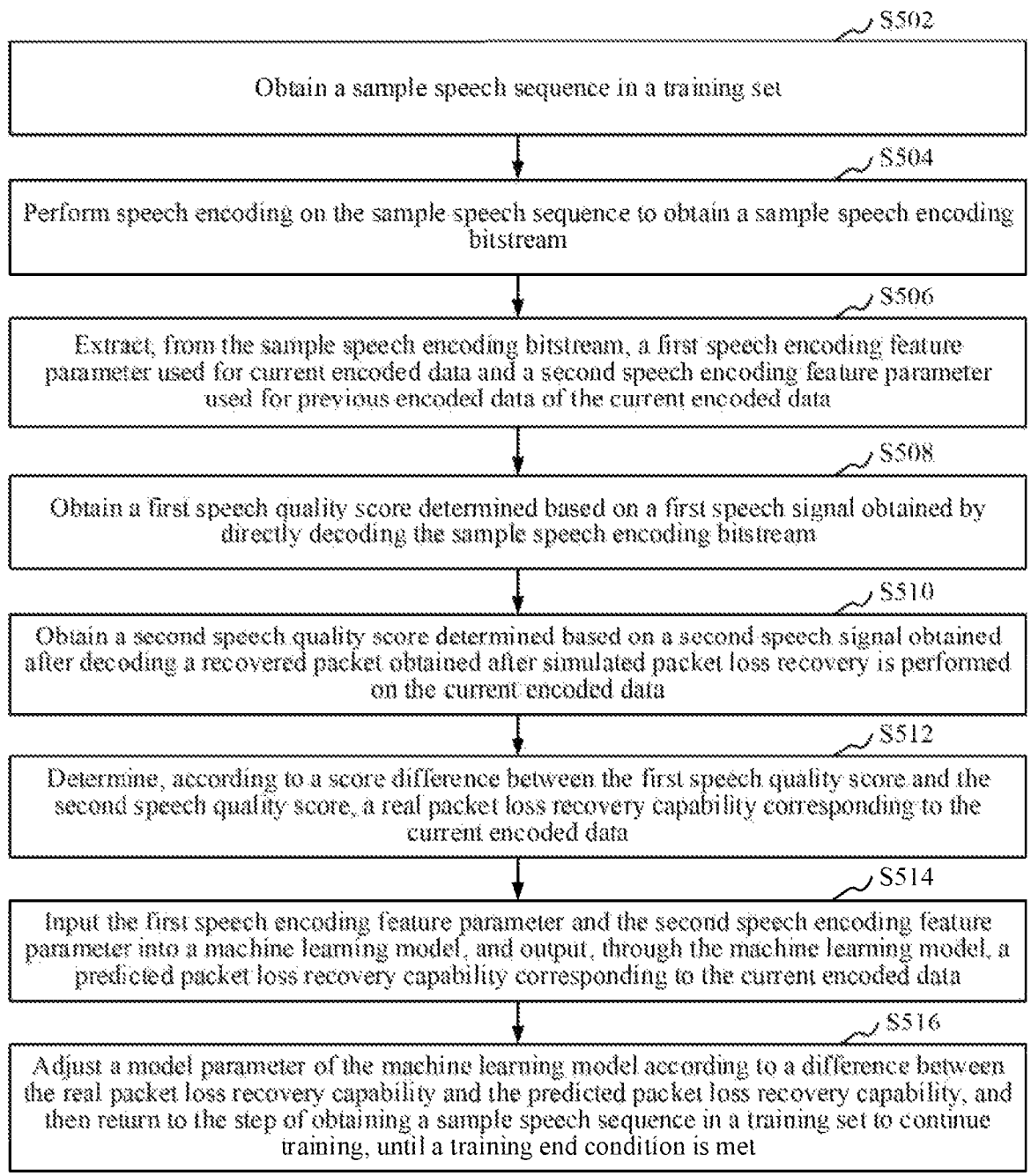
FIG. 5 is a schematic flowchart of training steps of a packet loss recovery capability prediction model in an embodiment.

FIG. 5 is a schematic flowchart of training steps (process) of a packet loss recovery capability prediction model according to an embodiment. The training steps may be performed by any computer device to obtain a trained packet loss recovery capability prediction model, and then the trained packet loss recovery capability prediction model is imported into a transmit end that needs to perform speech transmission. The computer device may alternatively be the transmit end in FIG. 1 or FIG. 2. In other words, the training steps may be directly performed by the transmit end to obtain a trained packet loss recovery capability prediction model. The computer device, is an execution body used as an example to describe the training steps of the packet loss recovery capability prediction model. The training process can include the following steps.

In S502, a sample speech sequence in a training set can be obtained.

For example, the computer device may obtain a large number of speech signals, and divide the speech signals to obtain a large quantity of speech signal sequences including speech segments, as sample speech sequences used for training a machine learning model.

In S504, speech encoding on the sample speech sequence can be performed to obtain a sample speech encoding bitstream.

For example, for each sample speech sequence, the computer device extracts a speech encoding feature parameter(s) corresponding to each speech segment, generates encoded data corresponding to each speech segment according to the extracted speech encoding feature parameter(s), and obtains a sample speech encoding bitstream corresponding to each sample speech sequence. The computer device may cache the speech encoding feature parameter(s) used for each piece of encoded data during encoding.

In S506, a first speech encoding feature parameter(s) used for current encoded data and a second speech encoding feature parameter(s) used for previous encoded data of the current encoded data can be extracted from the sample speech encoding bitstream.

As mentioned above, the packet loss recovery capability corresponding to the encoded data is related to the corresponding speech encoding feature parameter(s), and may also be related to the speech encoding feature parameter(s) corresponding to the previous encoded data and/or the subsequent encoded data. Therefore, during training, the computer device may use the speech encoding feature parameter(s) as an input of the machine learning model for training. In an embodiment, the transmit end may extract a currently processed first speech encoding feature parameter(s) corresponding to the current encoded data and a second speech encoding feature parameter(s) corresponding to the previous encoded data of the current encoded data as inputs of the machine learning model. As mentioned above, the previous encoded data is one piece of encoded data before the current encoded data, or may be multiple pieces of encoded data before the current encoded data.

A training object(sample) for each time of training is a piece of encoded data, and each sample speech encoding bitstream includes multiple pieces of encoded data. Therefore, each sample speech encoding bitstream may be used multiple times for the training. For example, during training, the transmit end may extract a speech encoding feature parameter(s) corresponding to an piece of encoded data and a speech encoding feature parameter(s) corresponding to an $(i-1)^{th}$ piece of encoded data in a sample speech encoding bitstream S. or the transmit end may extract a speech encoding feature parameter(s) corresponding to an $(1+1)^{th}$ piece of encoded data and a speech encoding feature parameter(s) corresponding to an $i^{th}$ piece of encoded data in a sample speech encoding bitstream S.

In S508, a first speech quality score determined based on a first speech signal can be obtained by decoding the sample speech encoding bitstream.

In order to obtain a target output of the machine learning model for the current training process, the transmit end needs to perform steps S508 to S512. The computer device may directly decode the sample speech encoding bitstream obtained after encoding, to obtain a first speech signal, and then tests (or measures) a first speech quality score corresponding to the first speech signal by using a speech quality test tool. The first speech signal is obtained by directly decoding the sample speech encoding bitstream, and there is no encoded data loss. Therefore, the obtained first speech signal is very close to an original sample speech sequence, and may be referred to as a lossless speech signal. The corresponding first speech quality score may be referred to as a lossless speech quality score.

In an embodiment, the speech quality test tool may be Perceptual Evaluation of Speech Quality (PESQ). PESQ can objectively evaluate quality of a speech signal according to some measurement standards, thereby providing a fully quantized speech quality measurement method. These measurement standards match with human perception of speech quality. The obtained first speech quality score may be denoted as MOS_UNLOSS.

In S510, a second speech quality score determined based on a second speech signal obtained after decoding a recovered packet(s) obtained after simulated packet loss recovery is performed on the current encoded data;

In an example, subsequently, the computer device may use the current encoded data as a lost data packet, simulate a decoder of the receive end to perform packet loss recovery on the current encoded data to obtain a corresponding recovered packet, decodes the recovered packet to obtain a corresponding second speech signal, and splices other speech segments in the original sample speech sequence with the second speech signal for speech quality scoring, to obtain a second speech quality score. The second speech signal is obtained by decoding the recovered packet obtained when simulated packet loss takes place, and there is a loss between the recovered packet and the lost current encoded data. Therefore, there is loss between the obtained second speech signal and the speech segment corresponding to the current encoded data. The second speech signal may be referred to as a lossy speech signal. The determined second speech quality score may be referred to as a lossy speech quality score, denoted as MOS_LOSS.

In S512, according to a score difference between the first speech quality score and the second speech quality score, a real packet loss recovery capability corresponding to the current encoded data can be obtained.

In an example, the real packet loss recovery capability corresponding to the current encoded data may be measured by using the score difference between the first speech quality score and the second speech quality score. That is, MOS_UNLOSS−MOS_LOSS may be used as the real packet loss recovery capability corresponding to the current encoded data, that is, a target output of the machine learning model. The real packet loss recovery capability corresponding to the current encoded data is inversely correlated with the score difference. That is, a smaller difference indicates better speech quality of the recovered packet obtained through packet loss recovery performed after simulating the packet loss of the current encoded data, and a stronger real packet loss recovery capability corresponding to the current encoded data. On the contrary, a larger difference indicates poorer (lower) speech quality of the recovered packet obtained through packet loss recovery performed after simulating the packet loss of the current encoded data.

In S514, the first speech encoding feature parameter(s) and the second speech encoding feature parameter(s) can be input into a machine learning model, and output, through the machine learning model, a predicted packet loss recovery capability corresponding to the current encoded data.

For example, after obtaining the target output of the current training process, the computer device may input the obtained first speech encoding feature parameter and the obtained second speech encoding feature parameter into the machine learning model, and output the predicted packet loss recovery capability corresponding to the current encoded data after processing by the internal network. S514 may alternatively be performed before step S508, and the order of execution of this step is not limited in this embodiment.

In S516, a model parameter(s) of the machine learning model can be adjusted according to a difference between the real packet loss recovery capability and the predicted packet loss recovery capability, and then return to the step of obtaining a sample speech sequence in a training set to continue training, until a training end condition is met.

For example, the computer device may construct a loss function according to the obtained real packet loss recovery capability and the predicted packet loss recovery capability obtained through the machine learning model. Model parameters obtained after the loss function is minimized are used as latest model parameters of the machine learning model. A next time of training continues to be performed according to the sample speech sequence, until the machine learning model converges or a quantity of training times reaches a preset quantity of times, to obtain a trained packet loss recovery capability prediction model with a packet loss recovery predict capability.

Figure 6:
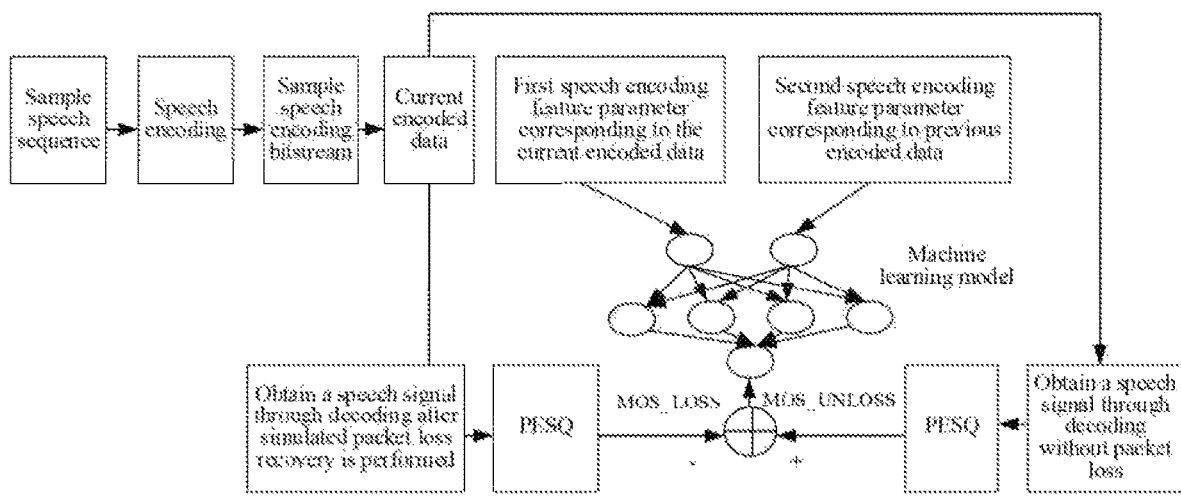
FIG. 6 is a training block diagram of a packet loss recovery capability prediction model in an embodiment.

FIG. 6 is a schematic diagram of a framework for training a machine learning model to obtain a packet loss recovery capability prediction model in an embodiment. FIG. 6 shows a schematic flowchart of a training process. A computer device obtains a sample speech sequence, and performs speech encoding on the sample speech sequence to obtain a sample speech encoding bitstream. MOS_UNLOSS is first obtained through PESQ by directly decoding the sample speech encoding bitstream corresponding to the scenario there is no packet loss in current encoded data, and then MOS_LOSS is obtained through PESQ by decoding the current encoded data after packet loss recovery is simulated on the current encoded data corresponding to the scenario there is packet loss in the current encoded data. A speech encoding feature parameter of the current encoded data and a speech encoding feature parameter of previous encoded data of the current encoded data are used as inputs of the machine learning model, to obtain a predicted packet loss recovery capability. MOS_UNLOSS−MOS_LOSS is used as a target output of the machine learning model, that is, a real packet loss recovery capability. Then model parameters of the machine learning model are adjusted according to the predicted packet loss recovery capability and the real packet loss recovery capability, to complete the current training process.

In an embodiment, step S304 of obtaining a packet loss recovery capability corresponding to the current encoded data according to a first speech encoding feature parameter(s) corresponding to the current encoded data and a second speech encoding feature parameter(s) corresponding to previous encoded data of the current encoded data by using a packet loss recovery capability prediction model based on machine learning includes: inputting the first speech encoding feature parameter(s) corresponding to the current encoded data and the second speech encoding feature parameter(s) corresponding to the previous encoded data of the current encoded data into the packet loss recovery capability prediction model; outputting, according to the first speech encoding feature parameter(s) and the second speech encoding feature parameter(s) through the packet loss recovery capability prediction model, a score difference between a first speech quality score determined by directly decoding the current encoded data and a second speech quality score determined by decoding the current encoded data after packet loss recovery is performed on the current encoded data; and determining the packet loss recovery capability corresponding to the current encoded data according to the score difference; the packet loss recovery capability corresponding to the current encoded data being inversely correlated with the score difference. As can be seen, the packet loss recovery capability corresponds to a score difference that indicates a quality loss caused by packet loss. The packet loss recovery capability is inversely correlated with the quality loss.

In an embodiment, before sending the current encoded data in the speech encoding bitstream to the receive end, the transmit end may predict, through a pre-trained packet loss recovery capability prediction model, a packet loss recovery capability corresponding to the current encoded data. For example, a first speech encoding feature parameter corresponding to the current encoded data and a second speech encoding feature parameter corresponding to previous encoded data are used as inputs of the packet loss recovery capability prediction model. An output of the packet loss recovery capability prediction model is a score difference between a first speech quality score determined by directly decoding the current encoded data and a second speech quality score determined by decoding the current encoded data after packet loss recovery is performed on the current encoded data. The score difference reflects a quality status of the packet loss recovery performed by the receive end after the packet loss of the current encoded data, that is, the magnitude of the packet loss recovery capability. The packet loss recovery capability is inversely correlated with the score difference. When the score difference is relatively large, that is, the packet loss recovery capability is less than a preset threshold, it indicates relatively poor quality of a speech signal obtained by the receive end through the packet loss recovery after the current encoded data is lost. On the contrary, when the score difference is relatively small, that is, the packet loss recovery capability is greater than the preset threshold, it indicates that the quality of the speech signal obtained by the receive end through the packet loss recovery after the current encoded data is lost falls within an acceptable range.

In S306, according to the packet loss recovery capability, whether redundant encoding needs to be performed can be determined; if yes, perform step S308 to perform redundant encoding according to the current encoded data to generate a corresponding redundancy packet, and then transmit the current encoded data and the redundancy packet to the receive end; and if no, perform step S310 to directly transmit the current encoded data to the receive end.

In an example, after obtaining the packet loss recovery capability corresponding to the current encoded data through the packet loss recovery capability prediction model, the transmit end determines, according to the predicted packet loss recovery capability, whether to add the current encoded data to FEC redundant encoding.

In an embodiment, the packet loss recovery capability output by the packet loss recovery capability prediction model is a value within a value range. The transmit end may compare the packet loss recovery capability with the preset threshold, and determine, according to a result of the comparison, whether redundant encoding needs to be performed on the current encoded data.

In an example, when the packet loss recovery capability is less than the preset threshold (in other words, the corresponding packet-loss-caused quality loss is higher than a threshold), redundant encoding is performed according to the current encoded data to generate a corresponding redundancy packet, and then the current encoded data and the redundancy packet are transmitted to the receive end. When the packet loss recovery capability is less than the preset threshold, it indicates relatively poor quality of a speech signal obtained by the receive end through packet loss recovery after the current encoded data is lost. Therefore, the FEC redundant encoding is used to resolve the problem of packet loss concealment of the transmission network. That is, the current encoded data needs to be added to the FEC redundant encoding to generate a redundancy packet and then transmitted to the receive end. When the packet loss recovery capability is greater than the preset threshold (in other words, the corresponding packet-loss-caused quality loss is less than a threshold), the current encoded data is directly transmitted to the receive end. When the packet loss recovery capability is greater than the preset threshold, it indicates that quality of a speech signal obtained by the receive end through packet loss recovery after the current encoded data is lost falls within an acceptable range. Therefore, for the encoded data, the transmit end does not need to use FEC redundant encoding as a policy for packet loss concealment. The transmit end may directly transmit the current encoded data to the receive end. If the current encoded data is lost, a packet loss recovery algorithm built in the decoder at the receive end is directly used to perform packet loss recovery on the current encoded data. In various embodiments, the encoded data can correspond to one or more frames (or segments) of audio signals or one or more packets (each including one or more frames), depending on the configuration of the respective transmit end and receive end.

In an embodiment, there may be two types of packet loss recovery capabilities output by the packet loss recovery capability prediction model. When the packet loss recovery capability is a first value, it indicates that quality of a speech signal obtained by the receive end through packet loss recovery after the current encoded data is lost is relatively poor. In this case, the transmit end needs to perform FEC redundant encoding on the current encoded data and then transmits the encoded data to the receive end. When the packet loss recovery capability is a second value, it indicates that quality of a speech signal obtained by the receive end through packet loss recovery after the current encoded data is lost falls within an acceptable range. In this case, the transmit end may directly transmit the current encoded data to the receive end. If the current encoded data is lost, a packet loss recovery algorithm built in the decoder at the receive end is directly used to perform packet loss recovery on the current encoded data. For example, the first value may be 1, and the second value may be 0. For another example, the first value may be 0, and the second value may be 1.

For example, a speech encoding bitstream to be transmitted includes P1, P2, P3, P4, and so on. It is assumed that the current encoded data is P7, and the transmit end predicts that a packet loss recovery capability corresponding to P7 is relatively weak. In this case, P7 may be added to a cache queue on which redundant encoding needs to be performed (at this time, the cache queue may be empty, or may have already stored the previous encoded data, such as P5). In an example, if the cache queue is not fully filled, a packet loss recovery capability corresponding to subsequent encoded data continues to be predicted, and a subsequent piece of encoded data with a relatively weak packet loss recovery capability is also added to the cache queue, until the cache queue is fully filled. The transmit end may perform redundant encoding on the encoded data in the cache queue to generate a redundancy packet, and then send the encoded data in the cache queue and the generated redundancy packet to the receive end, while emptying the cache queue.

In an embodiment, the performing redundant encoding according to the current encoded data to generate a corresponding redundancy packet, and then transmitting the current encoded data and the redundancy packet to a receive end includes: obtaining packet loss status information fed back by the receive end; determining, according to the packet loss status information, a redundancy rate corresponding to the current encoded data; and generating a redundancy packet based on the redundancy rate and the current encoded data, and then transmitting the current encoded data and the redundancy packet to the receive end.

In an example, the receive end may determine the packet loss status information according to a received data packet(s), and feed back the packet loss status information to the transmit end. The packet loss status information may be represented by a current packet loss rate. The receive end may encapsulate the packet loss rate into a packet and send the packet to the transmit end. The transmit end parses the received control packet to obtain the packet loss rate. A redundancy rate r may be a ratio of a quantity m of redundancy packets to a sum of the quantity m of redundancy packets and a quantity n of encoded data n, that is, r=m/(m+n). The transmit end may adjust the redundancy rate to implement different degrees of packet loss concealment. That is, a larger redundancy rate can resolve more continuous packet loss problems, and a smaller redundancy rate can resolve a small quantity of packet loss or sporadic packet loss problems. That is, r has a larger value at a higher packet loss rate and a smaller value at a lower packet loss rate.

In an embodiment, the speech (audio) transmission method further includes: directly performing speech decoding on the current encoded data when the receive end receives the current encoded data, to obtain a speech signal corresponding to the current encoded data; or performing redundant decoding through the receive end based on the redundancy packet when the receive end does not receive the current encoded data but receives the redundancy packet, to obtain the current encoded data, and then performing speech decoding on the current encoded data, to obtain a speech signal corresponding to the current encoded data.

For example, based on the foregoing example, after predicting the packet loss recovery capability, the transmit end adds encoded data P3, P4, P6, P7, P8, and P9 to a cache queue (a length of the cache queue may be set, for example, to 6), performs redundant encoding to generate redundancy packets R1 and R2, encapsulates the encoded data P3, P4, P6, P7, P8, and P9 in the cache queue and the generated redundancy packets R1 and R2 into a data set, and then sends the data set to the receive end. In order to help the receive end determine whether a packet loss occurs, packet sequence numbers of data packets in the data set may be consecutive, for example, may be 1, 2, 3, 4, 5, and 6. If the receive end receives P3, P4, and P6, because the packet sequence numbers are consecutive, and there is no packet loss, the receive end may directly perform speech decoding according to the received P3, P4, and P6, to obtain a corresponding speech signal. In addition, the receive end may cache P3, P4, and P6, for use in possible subsequent FEC redundant decoding, and if there is no packet loss in this set of data subsequently, clear the cache.

When the receive end receives P8 and P9, the receive end may determine, according to the packet sequence numbers, that P7 is lost. In this case, the receive end caches P8, P9, until R1 is received, and the receive end may perform redundant decoding according to cached P3, P4, P6, P8, P9, and R1 to obtain the lost P7. When R2 is further received, R2 may be directly discarded.

In an embodiment, the speech transmission method further includes performing packet loss recovery on the current encoded data through the receive end in response to the receive end receiving neither the current encoded data nor the redundancy packet, to obtain a recovered packet corresponding to the current encoded data, and performing speech decoding on the recovered packet, to obtain a speech signal corresponding to the current encoded data.

Based on the foregoing example, when P7 is lost, if the receive end receives neither R1 nor R2 within a particular period of time, the receive end cannot recover P7 according to cached P3, P4, P6, P8, and P9. In this case, a packet loss concealment (PLC) algorithm built in the decoder needs to be used to perform packet loss recovery on the current encoded data. Typically, the current encoded data is approximately replaced as the recovered packet according to decoding information of a previous data packet by using a pitch synchronous repetition method, and then the recovered packet is decoded to obtain a speech signal. Additionally, a condition for the receive end to be capable of recovering a lost packet in the data set through redundant decoding is: a quantity of pieces of encoded data received by the receive end+a quantity of redundancy packets received by the receive end a number of pieces of encoded data in the data set. When the condition is not met, the receive end also needs to perform packet loss recovery on the current encoded data by using the PLC algorithm built in the decoder.

According to the foregoing speech transmission method, before the current encoded data is transmitted to the receive end, the packet loss recovery capability of the receive end for the current encoded data is predicted according to the first speech encoding feature parameter(s) corresponding to the current encoded data and the second speech encoding feature parameter(s) corresponding to the previous encoded data by using the packet loss recovery capability prediction model based on machine learning. In this way, it is determined, according to the packet loss recovery capability, whether to perform redundant encoding on the current encoded data. If yes, redundant encoding needs to be performed on the current encoded data (possibly in combination with other encoded data) to generate a redundancy packet(s), and then the redundancy packets) is transmitted to the receive end by consuming network bandwidth resources. Otherwise, redundant encoding does not need to be performed on the current encoded data. Instead, the current encoded data is directly transmitted to the receive end, avoiding consumption of excess network bandwidth resources, thereby effectively improving overall utilization of network bandwidth and also ensuring a packet loss concealment capability of a transmission network.

Figure 7:
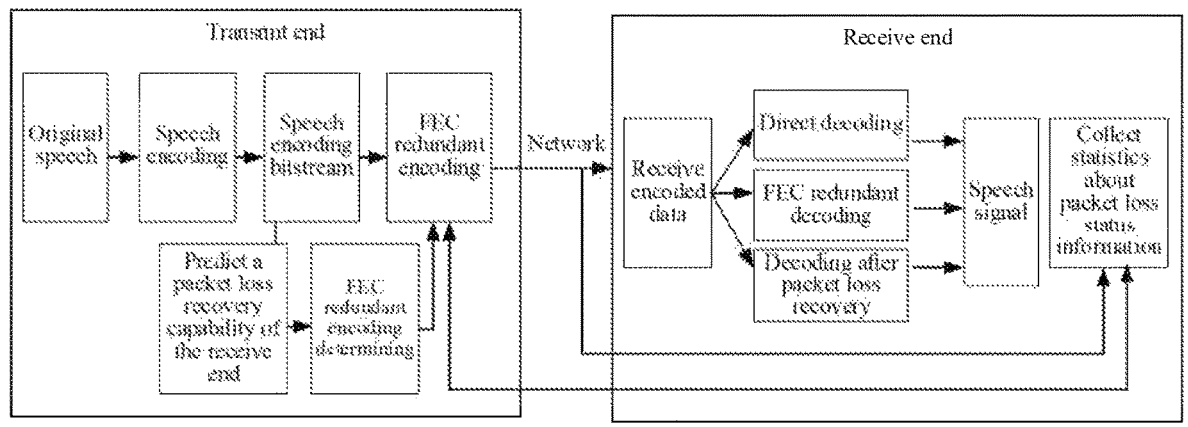
FIG. 7 is a flow block diagram of a speech transmission method in an embodiment.

FIG. 7 is a flow block diagram of a speech transmission method in an embodiment. Referring to FIG. 7, a transmit end obtains an original speech signal, and performs speech encoding on the original speech signal to obtain a speech encoding bitstream. Subsequently, the transmit end predicts, by using a packet loss recovery capability prediction model based on machine learning, a packet loss recovery capability of a receive end for each piece of encoded data in the speech encoding bitstream. Then, it is determined, according to the predicted packet loss recovery capability, whether to enable FEC redundant encoding for current encoded data. If it is determined to enable FEC redundant encoding for the current encoded data, a redundancy rate is set according to packet loss status information fed back by the receive end, then a redundancy packet is generated based on the redundancy rate according to the current encoded data, and the current encoded data and the redundancy packet are transmitted to the receive end. If it is determined not to enable redundant encoding for the current encoded data, the current encoded data is directly transmitted to the receive end.

If the receive end receives the current encoded data, a speech signal is reconstructed according to a normal decoding procedure. If the receive end does not receive the current encoded data but receives the redundancy packet, under a condition that a lost packet can be recovered through redundant decoding, the receive end can perform FEC redundant decoding to obtain the current encoded data. If the receive end does not receive the current encoded data or the corresponding redundancy packet within a period of time, it is determined that the current encoded data is lost. In this case, the receive end can perform packet loss recovery on the current encoded data by using a PLC algorithm that is built in a decoder, and then perform decoding to obtain a speech signal.

Figure 8:
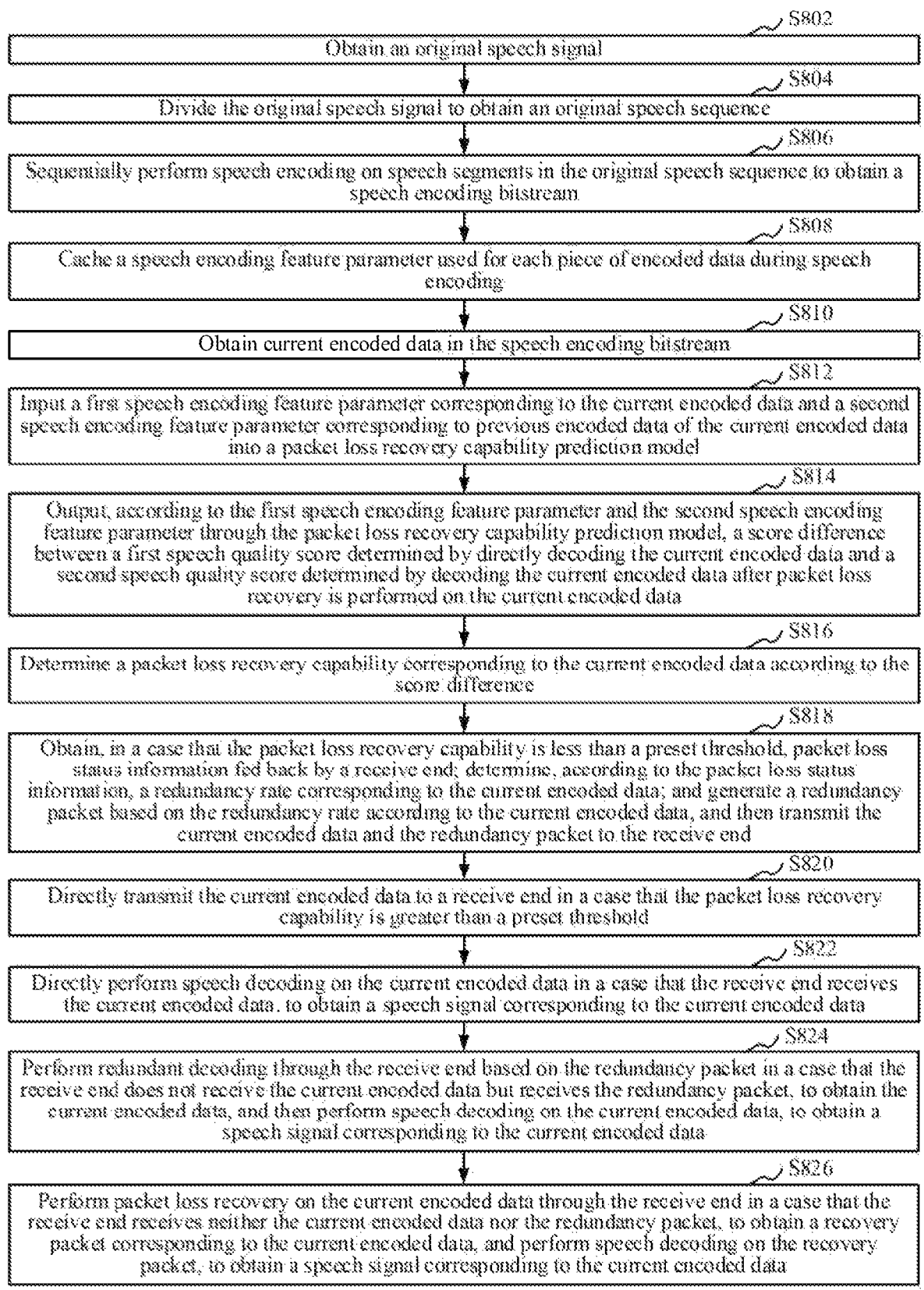
FIG. 8 is a schematic flowchart of a speech transmission method in a specific embodiment.

FIG. 8 is a schematic flowchart of a speech transmission process according to an embodiment. Referring to FIG. 8, the process can include the following steps.

In S802, an original speech signal can be obtained.

In S804, the original speech signal can be divided to obtain an original speech sequence.

In S806, speech encoding can be sequentially performed on speech segments in the original speech sequence to obtain a speech encoding bitstream.

In S808, a speech encoding feature parameter used for each piece of encoded data during speech encoding can be cached.

In S810, current encoded data in the speech encoding bitstream can be obtained.

In S812, a first speech encoding feature parameter corresponding to the current encoded data and a second speech encoding feature parameter corresponding to previous encoded data of the current encoded data can be into a packet loss recovery capability prediction model.

In S814, according to the first speech encoding feature parameter and the second speech encoding feature parameter, an output can be obtained from the packet loss recovery capability prediction model. The output may indicate a score difference between a first speech quality score determined by directly decoding the current encoded data and a second speech quality score determined by decoding the current encoded data after packet loss recovery is performed on the current encoded data.

In S816, a packet loss recovery capability corresponding to the current encoded data can be determined according to the score difference.

In S818, in response to the packet loss recovery capability being less than a preset threshold, determine, according to packet loss status information fed back by a receive end, a redundancy rate corresponding to the current encoded data; and generate a redundancy packet based on the redundancy rate and the current encoded data, and then transmit the current encoded data and the redundancy packet to the receive end. Otherwise, operations in S818 are skipped, and the process proceeds to S820.

In S820, the current encoded data is transmitted to a receive end in response to the packet loss recovery capability being greater than a preset threshold.

In S822, speech decoding on the current encoded data can be performed when the receive end receives the current encoded data, to obtain a speech signal corresponding to the current encoded data. Otherwise, operations in S822 are skipped and the process proceeds to S824.

In S824, redundant decoding through the receive end based on the redundancy packet when the receive end does not receive the current encoded data but receives the redundancy packet, to obtain the current encoded data, and then perform speech decoding on the current encoded data, to obtain a speech signal corresponding to the current encoded data. Otherwise, operations in S824 are skipped and the process proceeds to S826.

In S826, packet loss recovery on the current encoded data can be performed through the receive end when the receive end receives neither the current encoded data nor the redundancy packet, to obtain a recovered packet corresponding to the current encoded data, and perform speech decoding on the recovered packet, to obtain a speech signal corresponding to the current encoded data.

It is to be understood that although the steps in the flowcharts of FIG. 3, FIG. 5, and FIG. 8 are sequentially displayed in accordance with instructions of arrows, these steps are not necessarily performed sequentially in the order indicated by the arrows. Unless explicitly specified in this specification, execution of the steps is not strictly limited in the sequence, and the steps may be performed in other sequences. Some of the steps shown can be skipped. In addition, at least some steps in FIG. 3, FIG. 5, and FIG. 8 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

In an embodiment, a speech (audio) transmission system is provided. The speech transmission system may be the speech transmission system shown in FIG. 1 or FIG. 2, and includes the transmit end 110 and the receive end 120.

The transmit end 110 is configured to obtain current encoded data in a speech encoding bitstream, and obtain a packet loss recovery capability corresponding to the current encoded data according to a first speech encoding feature parameter corresponding to the current encoded data and a second speech encoding feature parameter corresponding to previous encoded data of the current encoded data by using a packet loss recovery capability prediction model based on machine learning.

The transmit end 110 is further configured to determine, according to the packet loss recovery capability, whether redundant encoding needs to be performed; and perform redundant encoding according to the current encoded data to generate a corresponding redundancy packet, and then transmit the current encoded data and the redundancy packet to the receive end, when redundant encoding needs to be performed; or directly transmit the current encoded data to the receive end when redundant encoding does not need to be performed;

The receive end 120 is configured to directly perform speech decoding on the current encoded data in response to the receive end receiving the current encoded data, to obtain a speech signal corresponding to the current encoded data; and further configured to perform redundant decoding based on the redundancy packet when the receive end does not receive the current encoded data but receives the redundancy packet, to obtain the current encoded data, and then perform speech decoding on the current encoded data, to obtain a speech signal corresponding to the current encoded data.

The receive end 120 is further configured to perform packet loss recovery on the current encoded data in response to the receive end receiving neither the current encoded data nor the redundancy packet, to obtain a recovered packet corresponding to the current encoded data, and perform speech decoding on the recovered packet, to obtain a speech signal corresponding to the current encoded data.

In an embodiment, the transmit end 110 is further configured to obtain an original speech signal; divide the original speech signal to obtain an original speech sequence; and sequentially perform speech encoding on speech segments in the original speech sequence to obtain a speech encoding bitstream.

In an embodiment, the transmit end 110 is further configured to obtain speech encoding feature parameters respectively corresponding to speech segments in an original speech sequence; obtain a speech encoding bitstream after performing speech encoding on the corresponding speech segments according to the speech encoding feature parameters to generate corresponding encoded data; and cache a speech encoding feature parameter used for each piece of encoded data during speech encoding.

In an embodiment, the transmit end 110 is further configured to input the first speech encoding feature parameter corresponding to the current encoded data and the second speech encoding feature parameter corresponding to the previous encoded data of the current encoded data into the packet loss recovery capability prediction model; output, according to the first speech encoding feature parameter and the second speech encoding feature parameter through the packet loss recovery capability prediction model, a score difference between a first speech quality score determined by directly decoding the current encoded data and a second speech quality score determined by decoding the current encoded data after packet loss recovery is performed on the current encoded data; and determine the packet loss recovery capability corresponding to the current encoded data according to the score difference; the packet loss recovery capability corresponding to the current encoded data being inversely correlated with the score difference.

In an embodiment, the transmit end 110 is further configured to obtain packet loss status information fed back by the receive end; determine, according to the packet loss status information, a redundancy rate corresponding to the current encoded data; and generate a redundancy packet based on the redundancy rate according to the current encoded data, and then transmit the current encoded data and the redundancy packet to the receive end.

In an embodiment, the receive end 120 is further configured to directly perform speech decoding on the current encoded data in response to the receive end receiving the current encoded data, to obtain a speech signal corresponding to the current encoded data.

In an embodiment, the receive end 120 is further configured to perform redundant decoding based on the redundancy packet when the receive end does not receive the current encoded data but receives the redundancy packet, to obtain the current encoded data, and then perform speech decoding on the current encoded data, to obtain a speech signal corresponding to the current encoded data.

In an embodiment, the receive end 120 is further configured to perform packet loss recovery on the current encoded data when the receive end receives neither the current encoded data nor the redundancy packet, to obtain a recovered packet corresponding to the current encoded data, and perform speech decoding on the recovered packet, to obtain a speech signal corresponding to the current encoded data.

In an embodiment, the transmit end 110 is further configured to obtain a sample speech sequence in a training set; perform speech encoding on the sample speech sequence to obtain a sample speech encoding bitstream; extract, from the sample speech encoding bitstream, the first speech encoding feature parameter used for the current encoded data and the second speech encoding feature parameter used for the previous encoded data of the current encoded data; obtain a first speech quality score determined based on a first speech signal obtained by directly decoding the sample speech encoding bitstream; obtain a second speech quality score determined based on a second speech signal obtained after decoding a recovered packet obtained after simulated packet loss recovery is performed on the current encoded data; determine, according to a score difference between the first speech quality score and the second speech quality score, a real packet loss recovery capability corresponding to the current encoded data; input the first speech encoding feature parameter and the second speech encoding feature parameter into a machine learning model, and output, through the machine learning model, a predicted packet loss recovery capability corresponding to the current encoded data; and adjust a model parameter of the machine learning model according to a difference between the real packet loss recovery capability and the predicted packet loss recovery capability, and then return to the step of obtaining a sample speech sequence in a training set to continue training, until a training end condition is met.

In the foregoing speech transmission system, before transmitting the current encoded data to the receive end, the transmit end predicts the packet loss recovery capability of the receive end for the current encoded data according to the first speech encoding feature parameter corresponding to the current encoded data and the second speech encoding feature parameter corresponding to the previous encoded data by using the packet loss recovery capability prediction model based on machine learning. In this way, it is determined, according to the packet loss recovery capability, whether to perform redundant encoding on the current encoded data. If yes, redundant encoding needs to be performed on the current encoded data to generate a redundancy packet, and then the redundancy packet is transmitted to the receive end by consuming network bandwidth resources. Otherwise, redundant encoding does not need to be performed on the current encoded data. Instead, the current encoded data is directly transmitted to the receive end, avoiding consumption of excess network bandwidth resources, thereby effectively improving overall utilization of network bandwidth and also ensuring a packet loss concealment capability of a transmission network.

Figure 9:
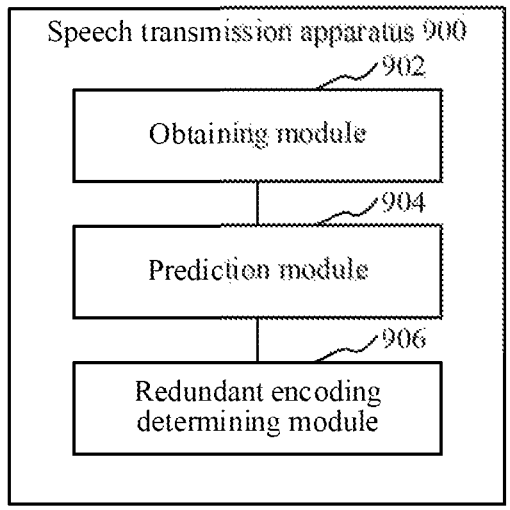
FIG. 9 is a structural block diagram of a speech transmission apparatus in an embodiment.

In an embodiment, as shown in FIG. 9, a speech transmission apparatus 900 is provided. The apparatus can be implemented as all or part of a receive end through software, hardware (processing circuitry), or a combination of software and hardware. The apparatus includes an obtaining module 902, a prediction module 904, and a redundant encoding determining module 906.

The obtaining module 902 is configured to obtain current encoded data in a speech encoding bitstream.

The prediction module 904 is configured to obtain a packet loss recovery capability corresponding to the current encoded data according to a first speech encoding feature parameter corresponding to the current encoded data and a second speech encoding feature parameter corresponding to previous encoded data of the current encoded data by using a packet loss recovery capability prediction model based on machine learning.

The redundant encoding determining module 906 is configured to determine, according to the packet loss recovery capability, whether redundant encoding needs to be performed; and perform redundant encoding according to the current encoded data to generate a corresponding redundancy packet, and then transmit the current encoded data and the redundancy packet to the receive end, when redundant encoding needs to be performed; or directly transmit the current encoded data to the receive end when redundant encoding does not need to be performed.

In an embodiment, the speech transmission apparatus 900 further includes a speech encoding module, configured to obtain an original speech signal: divide the original speech signal to obtain an original speech sequence; and sequentially perform speech encoding on speech segments in the original speech sequence to obtain a speech encoding bitstream.

In an embodiment, the speech transmission apparatus 900 further includes a speech encoding module and a cache module. The speech encoding module is configured to obtain speech encoding feature parameters respectively corresponding to speech segments in an original speech sequence;

and obtain a speech encoding bitstream after performing speech encoding on the corresponding speech segments according to the speech encoding feature parameters to generate corresponding encoded data. The cache module is configured to cache a speech encoding feature parameter used for each piece of encoded data during speech encoding.

In an embodiment, the prediction module 904 is further configured to input the first speech encoding feature parameter corresponding to the current encoded data and the second speech encoding feature parameter corresponding to the previous encoded data of the current encoded data into the packet loss recovery capability prediction model; output, according to the first speech encoding feature parameter and the second speech encoding feature parameter through the packet loss recovery capability prediction model, a score difference between a first speech quality score determined by directly decoding the current encoded data and a second speech quality score determined by decoding the current encoded data after packet loss recovery is performed on the current encoded data; and determine the packet loss recovery capability corresponding to the current encoded data according to the score difference; the packet loss recovery capability corresponding to the current encoded data being inversely correlated with the score difference.

In an embodiment, the redundant encoding determining module 906 is further configured to obtain, in response to the packet loss recovery capability being less than a preset threshold, packet loss status information fed back by the receive end; determine, according to the packet loss status information, a redundancy rate corresponding to the current encoded data; and generate a redundancy packet based on the redundancy rate according to the current encoded data, and then transmit the current encoded data and the redundancy packet to the receive end.

In an embodiment, the speech transmission apparatus 900 further includes a model training module, configured to obtain a sample speech sequence in a training set; perform speech encoding on the sample speech sequence to obtain a sample speech encoding bitstream; extract, from the sample speech encoding bitstream, the first speech encoding feature parameter used for the current encoded data and the second speech encoding feature parameter used for the previous encoded data of the current encoded data; obtain a first speech quality score determined based on a first speech signal obtained by directly decoding the sample speech encoding bitstream; obtain a second speech quality score determined based on a second speech signal obtained after decoding a recovered packet obtained after simulated packet loss recovery is performed on the current encoded data; determine, according to a score difference between the first speech quality score and the second speech quality score, a real packet loss recovery capability corresponding to the current encoded data; input the first speech encoding feature parameter and the second speech encoding feature parameter into a machine learning model, and output, through the machine learning model, a predicted packet loss recovery capability corresponding to the current encoded data; and adjust a model parameter of the machine learning model according to a difference between the real packet loss recovery capability and the predicted packet loss recovery capability, and then return to the step of obtaining a sample speech sequence in a training set to continue training, until a training end condition is met.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Before transmitting the current encoded data to the receive end, the foregoing speech transmission apparatus 900 predicts the packet loss recovery capability of the receive end for the current encoded data according to the first speech encoding feature parameter corresponding to the current encoded data and the second speech encoding feature parameter corresponding to the previous encoded data by using the packet loss recovery capability prediction model based on machine learning. In this way, it is determined, according to the packet loss recovery capability, whether to perform redundant encoding on the current encoded data. If yes, redundant encoding needs to be performed on the current encoded data to generate a redundancy packet, and then the redundancy packet is transmitted to the receive end by consuming network bandwidth resources. Otherwise, redundant encoding does not need to be performed on the current encoded data. Instead, the current encoded data is directly transmitted to the receive end, avoiding consumption of excess network bandwidth resources, thereby effectively improving overall utilization of network bandwidth and also ensuring a packet loss concealment capability of a transmission network.

Figure 10:
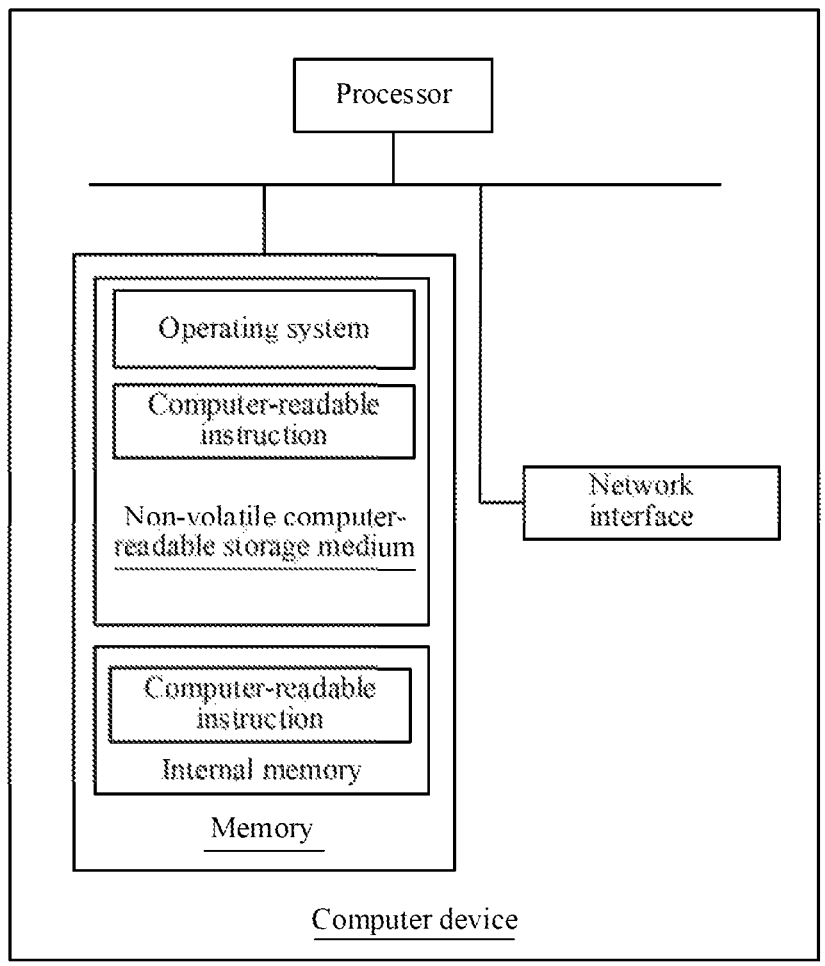
FIG. 10 is a structural block diagram of a computer device in an embodiment.

FIG. 10 is a diagram of a structure of a computer device according to an embodiment. The computer device may be specifically the transmit end 110 in FIG. 1. As shown in FIG. 10, the computer device includes a processor, a memory, and a network interface connected by a system bus. The memory includes non-transitory storage medium such as a non-volatile storage medium and an internal memory. The non-volatile storage medium of the computer device stores an operating system, and may further store computer-readable instructions. The computer-readable instructions, when executed by the processor, may cause the processor to implement a speech (audio) transmission method. The internal memory may also store a computer-readable instruction, and when the computer-readable instruction is executed by the processor, the processor may be caused to perform the speech transmission method.

A person skilled in the art may understand that, the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, the speech transmission apparatus 900 provided in this application may be implemented in a form of computer-readable instructions, and the computer-readable instructions may run on the computer device shown in FIG. 10. The memory of the computer device may store program modules forming the speech transmission apparatus 900, for example, the obtaining module 902, the prediction module 904, and the redundant encoding determining module 906 shown in FIG. 9. A computer-readable instruction formed by the program modules causes a processor to perform the steps in the speech transmission method in the embodiments of this application described in this specification.

For example, the computer device shown in FIG. 10 may perform step S302 by using the obtaining module 902 in the speech transmission apparatus 900 shown in FIG. 9. The computer device may perform step S304 by using the prediction module 904. The computer device may perform steps S306, S308, and S310 by using the redundant encoding determining module 906.

In an embodiment, a computer device is provided, including: a memory and a processor. The memory stores computer-readable instructions, the computer-readable instructions, when executed by the processor, causing the processor to perform the steps in the foregoing speech transmission method. Herein, the steps of the speech transmission method may be the steps of the speech transmission method in the foregoing embodiments.

In an embodiment, a non-transitory computer-readable storage medium is provided. The non-transitory computer-readable storage medium stores computer-readable instructions, the computer-readable instructions, when executed by the processor, causing the processor to perform the steps in the foregoing speech transmission method. Herein, the steps of the speech transmission method may be the steps of the speech transmission method in the foregoing embodiments.

In an embodiment, a computer program product or a computer-readable instruction is provided, the computer program product or the computer-readable instruction includes computer-readable instructions, and the computer-readable instructions are stored in the computer-readable storage medium. The processor of the computer device reads the computer-readable instructions from the computer-readable storage medium, and the processor executes the computer-readable instructions, to cause the computer device to perform the steps in the method embodiments. A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

For concise description, not all possible combinations of the technical features in the embodiment are described. However, provided that combinations of the technical features do not conflict with each other, the combinations of the technical features are considered as falling within the scope recorded in this specification.

The foregoing embodiments only show several implementations of this application, and descriptions thereof are in detail, but are not to be understood as a limitation to the patent scope of this application. A person of ordinary skill in the art may further make several variations and improvements without departing from the ideas of this application, and such variations and improvements all fall within the protection scope of this application.

What is claimed is:

1. An audio transmission method, comprising:
receiving, by processing circuitry, current encoded data of an audio signal;
determining, by the processing circuitry, a packet loss recovery capability corresponding to the current encoded data according to a first audio encoding feature parameter corresponding to the current encoded data and a second audio encoding feature parameter corresponding to previous or subsequent encoded data of the current encoded data using a packet loss recovery capability prediction neural network model, the packet loss recovery capability corresponding to a quality loss of a decoded audio when the current encoded data is lost while being transmitted over a network, wherein the packet loss recovery capability corresponding to the current encoded data is inversely correlated with a score difference between (i) a first audio quality score determined by decoding the current encoded data and (ii) a second audio quality score determined by decoding the current encoded data with packet loss recovery;
determining, by the processing circuitry, whether to perform redundant encoding for the current encoded data according to the packet loss recovery capability; and
in response to the redundant encoding being determined to be performed, performing, by the processing circuitry, the redundant encoding according to the current encoded data to generate a corresponding redundancy packet,
wherein the packet loss recovery capability prediction neural network model is trained, the training of the packet loss recovery capability prediction neural network model comprising:
receiving a sample audio sequence in a training set;
encoding the sample audio sequence to obtain a sample audio encoding bitstream;
extracting, from the sample audio encoding bitstream, a first sample audio encoding feature parameter corresponding to a current sample encoded data and a second sample audio encoding feature parameter corresponding to previous or subsequent sample encoded data of the current sample encoded data;
inputting the first audio encoding feature parameter and the second audio encoding feature parameter into a machine learning model to output a predicted packet loss recovery capability corresponding to the current sample encoded data; and
adjusting a model parameter of the machine learning model according to a difference between a real packet loss recovery capability and the predicted packet loss recovery capability.

2. The method according to claim 1, further comprising:
generating audio encoding feature parameters corresponding to audio segments in the audio signal; and
encoding each of the audio segments according to the respective audio encoding feature parameters to generate a sequence of encoded data including the current encoded data.

3. The method according to claim 1, wherein the determining the packet loss recovery capability comprises:
inputting the first audio encoding feature parameter corresponding to the current encoded data and the second audio encoding feature parameter corresponding to the previous or subsequent encoded data of the current encoded data into the packet loss recovery capability prediction neural network model to generate the score difference that predicts a difference between the first audio quality score determined by decoding the current encoded data and the second audio quality score determined by decoding the current encoded data after the packet loss recovery is performed on the current encoded data; and determining the packet loss recovery capability corresponding to the current encoded data according to the score difference, the packet loss recovery capability corresponding to the current encoded data being inversely correlated with the score difference.

4. The method according to claim 1, wherein the packet loss recovery capability prediction neural network model outputs one of a first value and a second value to indicate the packet loss recovery capability, the first value indicating the redundant encoding for the current encoded data is to be performed, the second value indicating the redundant encoding for the current encoded data is not performed.

5. The method according to claim 1, wherein the performing the redundant encoding comprises:

receiving packet loss status information from a receive end;

determining, according to the packet loss status information, a redundancy rate corresponding to the current encoded data; and generating the redundancy packet based on the redundancy rate and the current encoded data, wherein the current encoded data and the redundancy packet are transmitted to the receive end.

6. The method according to claim 1, wherein the training further comprises:

determining the first audio quality score based on a first audio signal obtained by decoding the sample audio encoding bitstream;

determining the second audio quality score based on a second audio signal obtained after decoding a recovered packet obtained after simulated packet loss recovery is performed on the current sample encoded data; and determining, according to the score difference between the first audio quality score and the second audio quality score, the real packet loss recovery capability corresponding to the current sample encoded data.

7. An audio transmission apparatus, comprising:

processing circuitry configured to receive current encoded data of an audio signal;

determine a packet loss recovery capability corresponding to the current encoded data according to a first audio encoding feature parameter corresponding to the current encoded data and a second audio encoding feature parameter corresponding to previous or subsequent encoded data of the current encoded data using a packet loss recovery capability prediction neural network model, the packet loss recovery capability corresponding to a quality loss of a decoded audio when the current encoded data is lost while being transmitted over a network, wherein the packet loss recovery capability corresponding to the current encoded data is inversely correlated with a score difference between (i) a first audio quality score determined by decoding the current encoded data and (ii) a second audio quality score determined by decoding the current encoded data with packet loss recovery;

determine whether to perform redundant encoding for the current encoded data according to the packet loss recovery capability; and in response to the redundant encoding being determined to be performed, performing the redundant encoding according to the current encoded data to generate a corresponding redundancy packet, wherein the packet loss recovery capability prediction neural network model is trained, the training of the packet loss recovery capability prediction neural network model comprising:

receiving a sample audio sequence in a training set;

encoding the sample audio sequence to obtain a sample audio encoding bitstream;

extracting, from the sample audio encoding bitstream, a first sample audio encoding feature parameter corresponding to a current sample encoded data and a second sample audio encoding feature parameter corresponding to previous or subsequent sample encoded data of the current sample encoded data;

inputting the first audio encoding feature parameter and the second audio encoding feature parameter into a machine learning model to output a predicted packet loss recovery capability corresponding to the current sample encoded data; and adjusting a model parameter of the machine learning model according to a difference between a real packet loss recovery capability and the predicted packet loss recovery capability.

8. The apparatus according to claim 7, wherein the processing circuitry is further configured to:

generate audio encoding feature parameters corresponding to audio segments in the audio signal; and encode each of the audio segments according to the respective audio encoding feature parameters to generate a sequence of encoded data including the current encoded data.

9. The apparatus according to claim 7, wherein the processing circuitry is further configured to:

input the first audio encoding feature parameter corresponding to the current encoded data and the second audio encoding feature parameter corresponding to the previous or subsequent encoded data of the current encoded data into the packet loss recovery capability prediction neural network model to generate the score difference that predicts a difference between the first audio quality score determined by decoding the current encoded data and the second audio quality score determined by decoding the current encoded data after the packet loss recovery is performed on the current encoded data; and determine the packet loss recovery capability corresponding to the current encoded data according to the score difference, the packet loss recovery capability corresponding to the current encoded data being inversely correlated with the score difference.

10. The apparatus according to claim 7, wherein the packet loss recovery capability prediction neural network model outputs one of a first value and a second value to indicate the packet loss recovery capability, the first value indicating the redundant encoding for the current encoded data is to be performed, the second value indicating the redundant encoding for the current encoded data is not performed.

11. The apparatus according to claim 7, wherein the processing circuitry is further configured to:

receive packet loss status information from a receive end;

determine, according to the packet loss status information, a redundancy rate corresponding to the current encoded data; and generate the redundancy packet based on the redundancy rate and the current encoded data, wherein the current encoded data and the redundancy packet are transmitted to the receive end.

12. The apparatus according to claim 7, wherein the processing circuitry is further configured to:
determine the first audio quality score based on a first audio signal obtained by decoding the sample audio encoding bitstream;
determine the second audio quality score based on a second audio signal obtained after decoding a recovered packet obtained after simulated packet loss recovery is performed on the current sample encoded data; and
determine, according to the score difference between the first audio quality score and the second audio quality score, the real packet loss recovery capability corresponding to the current sample encoded data.

13. A non-transitory computer-readable storage medium storing instructions, which, when executed by at least one processor, cause the at least one processor to perform:
receiving current encoded data of an audio signal;
determining a packet loss recovery capability corresponding to the current encoded data according to a first audio encoding feature parameter corresponding to the current encoded data and a second audio encoding feature parameter corresponding to previous or subsequent encoded data of the current encoded data using a packet loss recovery capability prediction neural network model,
the packet loss recovery capability corresponding to a quality loss of a decoded audio when the current encoded data is lost while being transmitted over a network, wherein the packet loss recovery capability corresponding to the current encoded data is inversely correlated with a score difference between (i) a first audio quality score determined by decoding the current encoded data and (ii) a second audio quality score determined by decoding the current encoded data with packet loss recovery;
determining whether to perform redundant encoding for the current encoded data according to the packet loss recovery capability; and
in response to the redundant encoding being determined to be performed, performing the redundant encoding according to the current encoded data to generate a corresponding redundancy packet,
wherein the packet loss recovery capability prediction neural network model is trained, the training of the packet loss recovery capability prediction neural network model comprising:
receiving a sample audio sequence in a training set;
encoding the sample audio sequence to obtain a sample audio encoding bitstream;
extracting, from the sample audio encoding bitstream, a first sample audio encoding feature parameter corresponding to a current sample encoded data and a second sample audio encoding feature parameter corresponding to previous or subsequent sample encoded data of the current sample encoded data;
inputting the first audio encoding feature parameter and the second audio encoding feature parameter into a machine learning model to output a predicted packet loss recovery capability corresponding to the current sample encoded data; and
adjusting a model parameter of the machine learning model according to a difference between a real packet loss recovery capability and the predicted packet loss recovery capability.

14. The non-transitory computer-readable storage medium according to claim 13, wherein the instructions cause the at least one processor to further perform:
generating audio encoding feature parameters corresponding to audio segments in the audio signal; and
encoding each of the audio segments according to the respective audio encoding feature parameters to generate a sequence of encoded data including the current encoded data.

15. The non-transitory computer-readable storage medium according to claim 13, wherein the instructions cause the at least one processor to further perform:
inputting the first audio encoding feature parameter corresponding to the current encoded data and the second audio encoding feature parameter corresponding to the previous or subsequent encoded data of the current encoded data into the packet loss recovery capability prediction neural network model to generate the score difference that predicts a difference between the first audio quality score determined by decoding the current encoded data and the second audio quality score determined by decoding the current encoded data after the packet loss recovery is performed on the current encoded data; and
determining the packet loss recovery capability corresponding to the current encoded data according to the score difference, the packet loss recovery capability corresponding to the current encoded data being inversely correlated with the score difference.

16. The non-transitory computer-readable storage medium according to claim 13, wherein the instructions cause the at least one processor to further perform:
outputting from the packet loss recovery capability prediction neural network model one of a first value and a second value to indicate the packet loss recovery capability, the first value indicating the redundant encoding for the current encoded data is to be performed, the second value indicating the redundant encoding for the current encoded data is not performed.

17. The non-transitory computer-readable storage medium according to claim 13, wherein the instructions cause the at least one processor to further perform:
receiving packet loss status information from a receive end;
determining, according to the packet loss status information, a redundancy rate corresponding to the current encoded data; and
generating the redundancy packet based on the redundancy rate and the current encoded data, wherein the current encoded data and the redundancy packet are transmitted to the receive end.

* * * * *